United States Patent [19]

Tsutamori et al.

[11] Patent Number: 5,247,372
[45] Date of Patent: Sep. 21, 1993

[54] IMAGE COMPOSING METHOD

[75] Inventors: Yasuhiro Tsutamori; Kazuhiko Akimoto, both of Kaisei, Japan

[73] Assignee: Fuji Photo Film Co., Ltd., Kanagawa, Japan

[21] Appl. No.: 578,159

[22] Filed: Sep. 6, 1990

[30] Foreign Application Priority Data

Sep. 20, 1989 [JP] Japan .................. 1-244824

[51] Int. Cl.$^5$ ........................ H04N 1/387; H04N 1/40
[52] U.S. Cl. .................... 358/452; 358/448; 358/450
[58] Field of Search ............... 358/400, 401, 403, 443, 358/445, 448, 449, 450, 451, 452, 453

[56] References Cited

U.S. PATENT DOCUMENTS

| 4,535,365 | 8/1985 | Sakamoto | 358/452 |
| 4,673,989 | 6/1987 | Yamada et al. | 358/450 |
| 4,679,155 | 7/1987 | Mitsuka | 358/450 |
| 4,683,500 | 7/1987 | Kitamura et al. | 358/450 |
| 4,733,304 | 3/1988 | Homma et al. | 358/452 |
| 4,754,325 | 6/1988 | Ishida et al. | 358/452 |

Primary Examiner—Edward L. Coles, Sr.
Assistant Examiner—Thomas D. Lee
Attorney, Agent, or Firm—Sughrue, Mion, Zinn, Macpeak & Seas

[57] ABSTRACT

An image processing system is provided with an input controller, a file server, an image setter and a work station each having respectively an independent CPU, e.g., a microprocessor, a microcomputer or the like, which allows each unit to operate independently in an parallel manner so as to carry out image processing efficiently at a high speed, while a hard copy or a block copy for printing with a high quality image being fit into a frame on a layout pasteboard by means of an image output apparatus can be obtained by interactive-editing information on the layout pasteboard as well as designs and characters, to minimize the capacity of the memory. According to one aspect of the invention, the system is adapted to output a composed image according to a method comprising the steps of: inputting and storing an image of the layout pasteboard and an image for printing by reading through the input controller, carrying out a layout drawing at the work station wherein operations are performed with relatively low quality data thinned from the read data, and then performing correction with respect to picture elements so that the image may exactly fit into the frame when the composed image is recorded or output by the image output unit, which has a higher resolution than the work station.

8 Claims, 9 Drawing Sheets

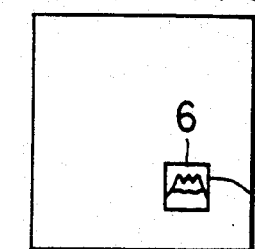
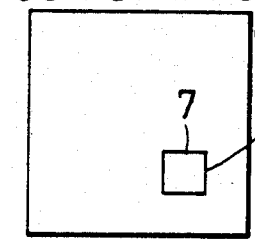
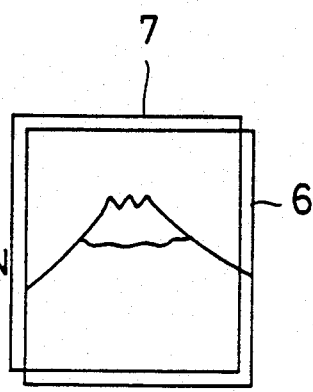
FIG.7
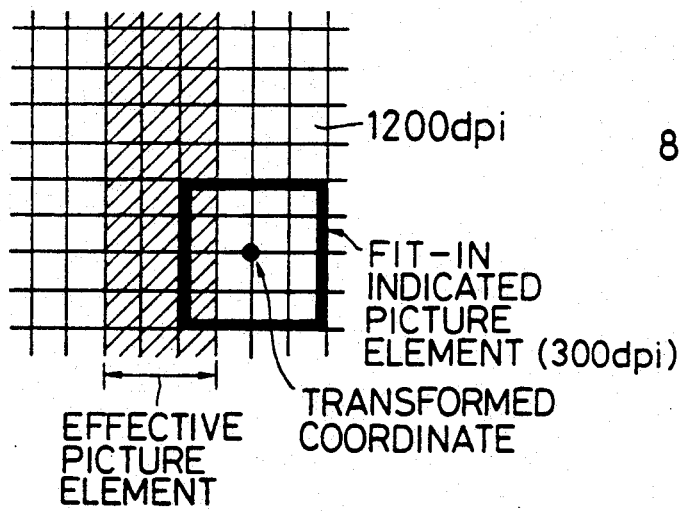
FIG.8
| #1 | #2 | #3 |
|----|----|----|
| #8 |    | #4 |
| #7 | #6 | #5 |
FIG.9

IMAGE COMPOSING METHOD

BACKGROUND OF THE INVENTION

1. Field of the Invention

This invention relates to an image composing method in an image processing system which reads out an image of characters and an image of designs drawn on a layout pasteboard (blockcopy pasteboard, rough design sheet and the like) to carry out a layout-designed output, to the method allowing a design and a screen and the like to exactly fit into the frame of the layout pasteboard to compose an output an image.

2. Description of the Prior Art

It has been heretofore desirable to provide an image processing system for typographers who require high quality printed matter in which characters, designs or the like are consolidated as a whole for editing such a system has not been proposed but would be less capable and practical in use even if it were available.

Particularly, among others, a desk top publishing art has been gradually realized in a manner of description such as a post script and the like, but is still less capable and efficient of an image art. A system for the typographers has been of course, available but is insufficient in handling (input, display, storage, processing, edition, and output and the like) data in bulk and at a high speed. This is because the data consisting of information on characters and images is too much to be synthetically processed by a description language and a central processing unit (CPU; software), thus exhibiting a poor performance. In the case of outputting only code data i.e., character code data, for manufacturing a block copy for printing, it is necessary to convert the code data to bit map data for each character and further to develop it in advance to the bit map data every some rasters. In the case of outputting only the bit map data, the whole or a part of the output image is stored in a temporary buffer and then transferred to an output unit. However, in order to reduce the capacity of the above buffer, the output unit awaits during the time when the output image is stored in the buffer.

However, the apparatus described above can not simultaneously output characters and pictures laid out and has a defect that it needs much time to realize even if the apparatus in advance carries out a layout of the character bit map in the buffer which outputs the bit map. Alternatively, the apparatus outputs the characters and the pictures on the separate paper or photographic film, respectively, and an operator patches on the paper or photographic film. Under these situations, it takes much time due to the repetition work such as exposure or printing, and photosensitive materials intermediately produced are wasted.

Further, in general, the resolution of the image recorded on a photosensitive material is much different from that of the image displayed on a CRT or the like, therefore it is necessary to carry out a coordinate transformation from a picture element coordinate on a thinned image by the logical sum operation to another picture element coordinate on an original image. In such situation, it is easy to perform the above coordinate transformation by adopting a coordinate in the vicinity of the center of the picture element on the thinned image as the coordinate to be transformed. However, in case that the thinning process is carried out by the logical sum operation, the picture element transformed may happen not to correspond to the effective picture element of the original image when the line width has more than two picture elements of the original image or the pattern is located at the corner in the thinned or rougher picture element, thus making an error happen between the frame on the layout pasteboard and the layout drawn pattern.

SUMMARY OF THE INVENTION

This invention has been accomplished in view of what is discussed above. The object of this invention is, therefore, to provide an image composing method in an image processing system which interactively edits and processes a large quantity of image data consisting of characters and pictures at a high speed in an electronic apparatus, including the steps of; determining a new coordinate from a coordinate of a picture element which is indicated on a thinned image by the logical sum operation, so as to minimize an error or a difference from an effective picture element on an original image, and thereby outputting a composed image so that a layout image may be fit into a frame on a layout pasteboard.

According to one aspect of this invention, for achieving the objects described above, there is provided an image composing method, in an image processing system comprising an input controller for high lighting and compressing high density data for an image read out by an input unit and for temporarily storing said compressed image data in a buffer; a work station permitting picture editing of both code information edited by an editing input unit and the image data by the use of an input operating means and a display means; a file server connected to said input controller and said work station by bus lines for storing said image data, said code information and edited data picture-edited by said work station in a memory means; and an image setter for reading out said edited data stored in said memory means and subjecting said edited data to a required data processing to output the image on the image output unit, which comprises the steps of: inputting an image of a layout pasteboard for printing and/or a print image as image information by means of said input unit so as to store them in said memory means, displaying a frame drawn on said layout pasteboard and said print image on said display means to be subjected to layout-drawing in said work station, when the layout image, being adapted to have a higher resolution than said display image, is outputted and recorded with being fit into said frame, or when the area within said frame, being screened is outputted and recorded; correcting a coordinate between said layout image or screened area and said frame, thus preventing any space from existing therebetween.

The nature, principle and utility of the invention will become more apparent from the following detailed description when read in conjunction with the accompanying drawings.

BRIEF DESCRIPTION OF THE DRAWINGS

In the accompanying drawings:

FIG. 7 and FIG. 8 are views for explaining the image composing method of this invention;

FIG. 9 shows the mask pattern applied to this invention; and

DESCRIPTION OF THE PREFERRED EMBODIMENT

Figure 1A:
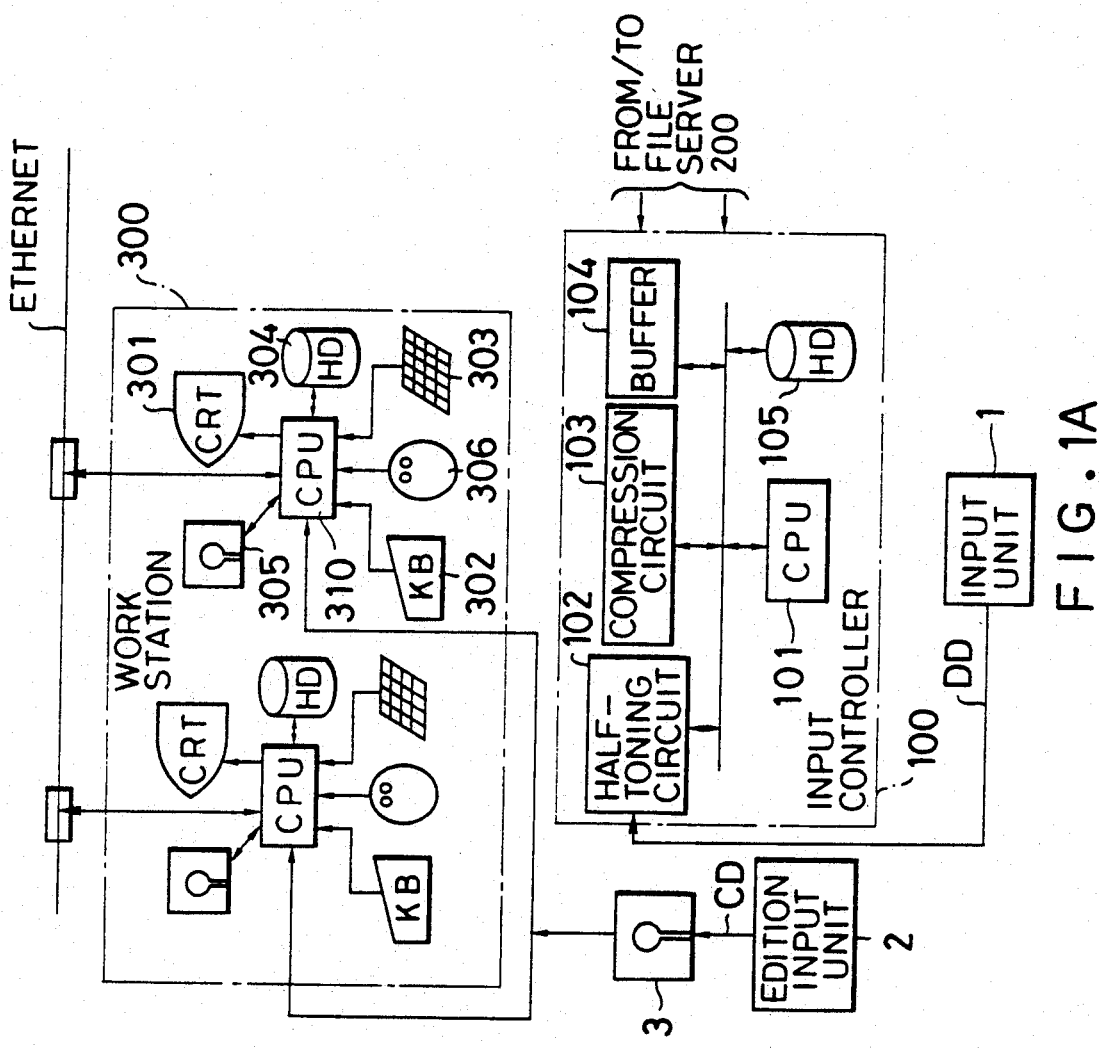
FIGS. 1A and 1B are block diagrams showing the overall configuration of the image processing system of this invention.
Figure 1B:
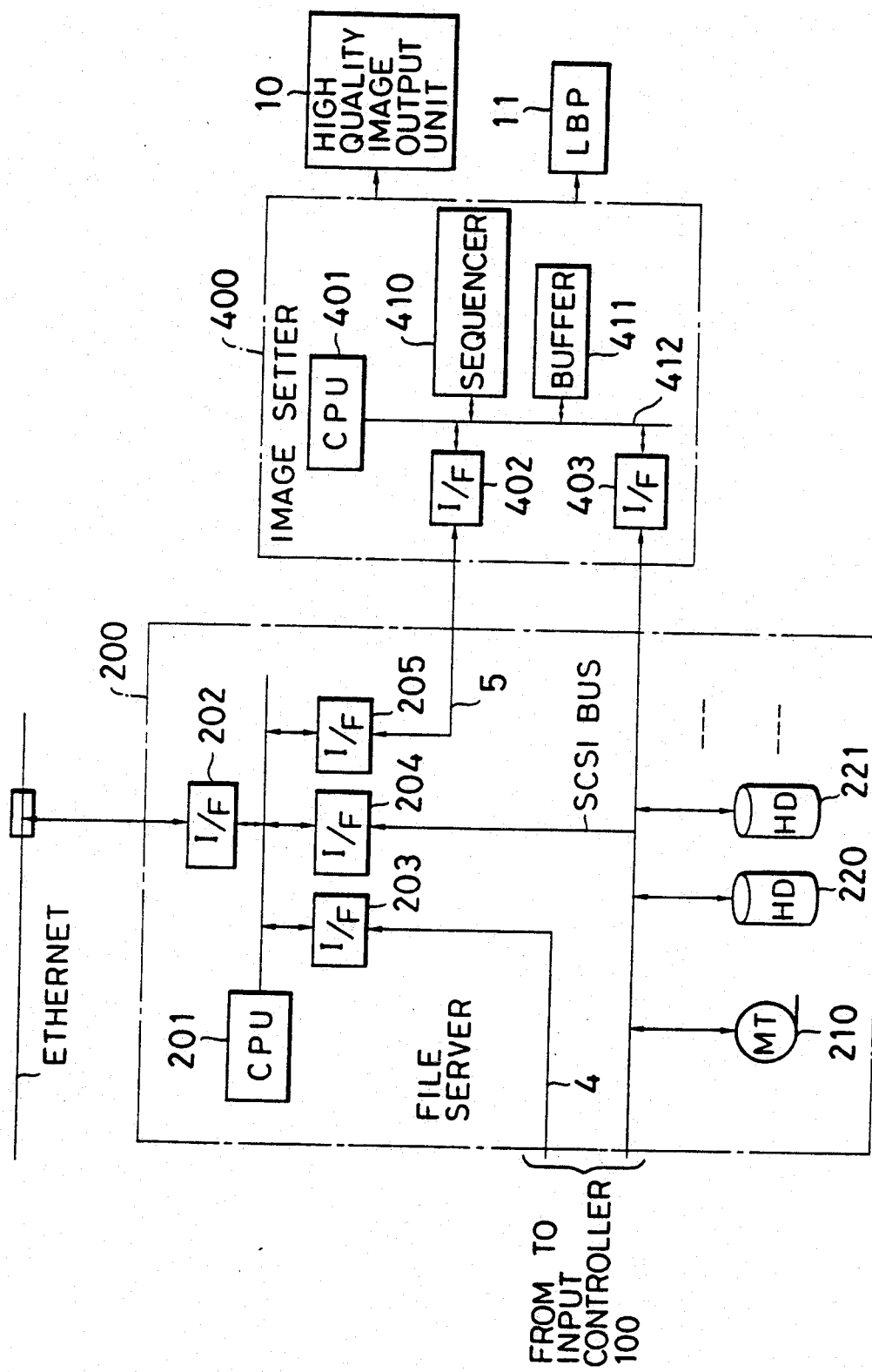

FIGS. 1A and 1B are block diagrams showing the whole arrangement of an image processing system according to this invention. An input unit 1 (such as a scanner or the like) is adapted to read originals such as designs, characters, patterns, as well as a layout pasteboard and the like. Density data DD of the image as obtained from the input unit 1 is input to an input controller 100. The input controller 100 manipulates, i.e., forms halftone image data, from the aforementioned inputted density data DD through an incorporated CPU 101 by means of a halftoning circuit 102 and then compresses it by a compression circuit 103. The compressed data is temporarily stored in a buffer 104 and is then transferred to a magnetic tape 210 of a file server 200 or hard discs 220, 221, . . . thereof. The input controller 100 includes a local disc (hard disc) 105 for temporarily storing the data. The file server 200 is provided with a CPU 201 and connected to the other apparatuses through interfaces 202 to 205. A code information CD (such as characters and the like) which is obtained from an edition input unit 2 such as a word processor and composing machine and the like is stored in a floppy disc 3 and then read out. The code information CD is then input to a work station 300. This input may be input on-line. The work station 300 carries a plurality of terminal units each having a CRT 301 as a display means, a keyboard 302, a mouse 306 and a digitizer 303 acting as input operation means, and a hard disc 304 and a floppy disc 305 acting as memory means. The work station 300 is interconnected, in an exemplary case, by an Ethernet (one type of bus line system) to the file server 200. Image data, frame data and contour display image data obtained by the input controller 100, which are thinned for the CRT display (for instance, 100 dpi) are stored as well as high density data (not thinned) for the image output, in the magnetic tape 210 or the hard discs 22N . . . . Those three thinned data are read out and transferred by interfaces 204, 202 through a SCSI bus to the work station 300. A control command and the like between the work station 300 and the input controller 100 are transferred by the interface 203 of the file server 200 through an auxiliary line 4. The file server 200 is also connected to an image setter 400. More specifically, the image setter 400 includes a CPU 401 which is connected by an interface 402 to another auxiliary data line 5 of the file server 200 and is coupled by an interface 403 to the SCSI bus. The image setter 400 further includes a sequencer 410 and a buffer 411 for storing required data. A high quality image output unit 10 for outputting the high quality image (for instance, 1200 dpi) and a laser beam printer 11 for outputting the relatively low quality image are connected to the image setter 400. It is noted that the hard discs 22N . . . are adapted to store not only fixed data (bit map data) such as a logo, a crest and the like but also vector font data for outputting characters.

Now, the input unit 1 is adapted to digitize all of designs (gray scale image or halftone image), line image and character image (binary image) as density data (e.g., 8 bit/picture element). Signals input based on 8 bit/picture element, in case of the design, are manipulated by the input controller 100 to produce information of 4 bit/picture element and in case of the binary image are converted to information of 1 bit/picture element. Generally the character code data is input from the work station 300 by means of the code, but also may be input as an image through the input unit 1. Because in this case the character is input as an image, it is handled as an image. More specifically character is handled as bit map data, although it looks like, i.e., is expressed as a. In the image setter 400 which performs all of the output operations because the code and the vector information are wholly converted to the bit map data, the term "image output" defines outputting the bit map data.

In this manner, the image processing system of this invention does not require manual paste-up of drawings and photographs or manual photo-composing to facilitate reduction of labour and material.

Figure 2:
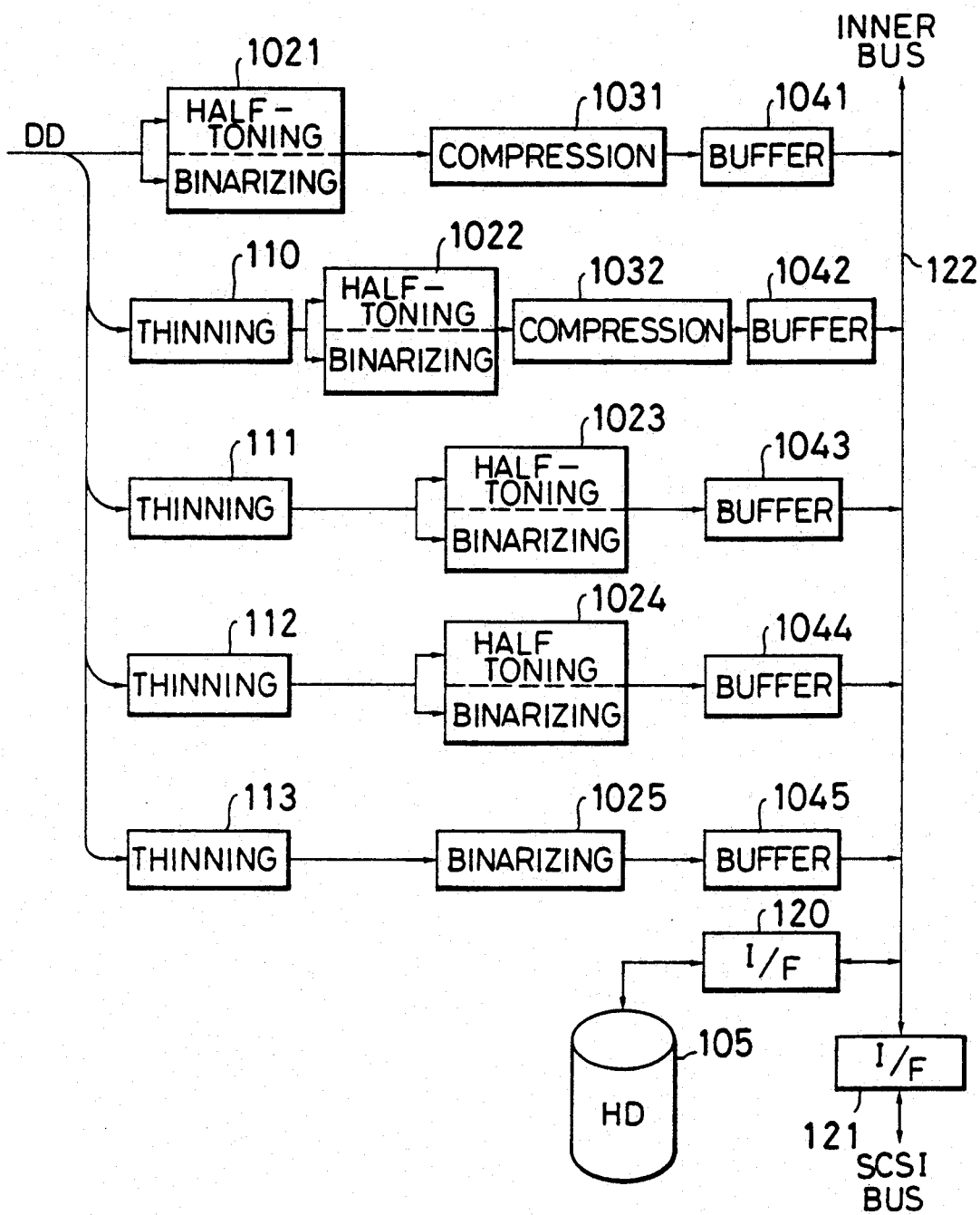
FIG. 2 is a block diagram showing an exemplary configuration of the input controller.

Now, the input controller 100 will be illustrated with reference to FIG. 2. The input controller 100 is adapted to process the density data DD inputted from the input unit 1 to simultaneously create five sets of data which comprise high density data for the high quality image output unit 10, data for the laser beam printer 11, two types of data for the display of the CRT 310 of the work station 300, and rough image data made rough enough to show a contour of the image. Such simultaneous processing of these data in an overlapping manner enables the system to accelerate the speed so that the data forming operation load of the CPU 101 may be reduced by the hardware. More specifically, the high density data for the high quality image output unit 10 is caused by manipulating the density data DD through a halftoning circuit 1021 and data-compressing it through a compression circuit 1031, the compressed data being held temporarily in a buffer 1041. In order to obtain the data used for allowing the laser beam printer 11 to output an image of relatively low quality, the density data DD is thinned (110) at a predetermined interval (for instance ½) and then the rough data is manipulated by another halftoning circuit 1022 and compressed by another compression circuit 1032. The produced data for printer 11 is then temporarily held in another buffer 1042. Further, for the purpose of two types of rougher data for the CRT 301 display, the density data DD is thinned at a predetermined interval and then manipulated by different halftoning circuits 1023, 1024 and finally, is temporarily held in different buffers 1043, 1044. For producing the data for the line image which is prepared when a cut-out mask is formed from a halftone image, the data after the Laplacean or the unsharp mask processing for representing the contour data is thinned (113) and then binarized by a binary circuit 1025 and is also temporarily stored in a buffer 1045.

With this arrangement, the CPU 101 communicates with the input unit 1 by a data line (not shown) and also communicates through an auxiliary data line 4 and a dual port RAM (not shown) with the file server 200. When a data transmission request from the input unit 1 is made, the CPU 101 is caused to set the data required for the respective circuits shown in FIG. 2, storing the set data in the local disc 105 while a set value in association with the auxiliary scanning being set. The density data DD from the input unit 1 is input every one line and stored in the buffers 104 (1041 to 1045) upon synchronization of the respective circuits shown in FIG. 2. During this period of time, the CPU 101 checks not only for changeover of the SCSI bus and of a data compressing output buffer 1041 but also for the presence of error information from the respective circuits. The data once stored in the buffer 104 and the local disc 105 are sorted by the command of the CPU 101 and output to the SCSI bus from without.

The file server 200 is fabricated in the manner as shown in FIGS. 1A and 1B and functions as common file control such as file control and community of files and as control of network communication and other communication between units. More specifically, the file server 200 controls, through the SCSI bus, the files for the hard discs (220, 221, . . .) and the magnetic tape 210 and is adapted, through the Ethernet, to provide and function as a software interface for the work station 300. In addition, the file server 200 provides utility functions with respect to service for file control information on the input controller 100 and the image setter 400 and with respect to file control via the SCSI bus. Such utility functions are, for instance, a registration of a font and a garbage collection (dust pick-up and disposal) and the like. The registration of the font may be classified into two types. The first type of font registration is supported by the system, wherein a vector font prepared by another font preparing system is stored as a magnetic tape form in the hard disc of the present image processing system. The other type of font registration is a registration of external characters which do not exist in the system. In this instance, the font prepared by another system is registered into the system by means of the floppy or magnetic tape.

The file server 200 is adapted to perform service and store the data for transferring the data between the work station 300 and the input controller 100 and between the latter and the image setter 400. The input controller 100 serves to obtain required information about reserving and deleting the region of respective file from the file server 200 through the auxiliary data line 4 and the dual port RAM. For the purpose of registering the data which is once held in the buffer 104 installed in the input controller 100, as the file for the image processing system, information on the file name, the file capacity and the like are transferred to the file server 200 to allow the hard discs 220, 221, . . . on the SCSI bus access thereto. This will enable the file server 200 to communicate with a directory and to control disc area and the like. The file server 200 is also adapted to transfer the file data by the Ethernet to the work station 300 and receive the data from the work station. At this moment, the file server 200 controls the hard discs (220, 221, . . .) on the SCSI bus and the magnetic tape 210 under the command of the work station 300 to renew necessary information on the directory and the like. Furthermore, the file server 200 obtaines the command over the image setter 400 and the other command over the magnetic tape, thereby performing service according to those commands. The file server 200 sends a predetermined command through the auxiliary data line 5 and the dual port RAM to the image setter 400, while transferring the file control information in response to the request from the image setter 400, and is adapted to allow the image setter 400 to access directly to the disc data on the SCSI bus. In addition, the file server 200 is adapted to control the utility information as to the whole image processing system by means of the hard discs 220, 221, . . . on the SCSI bus. Here the utility information includes the font information, common files and the like in the system.

Figure 3:
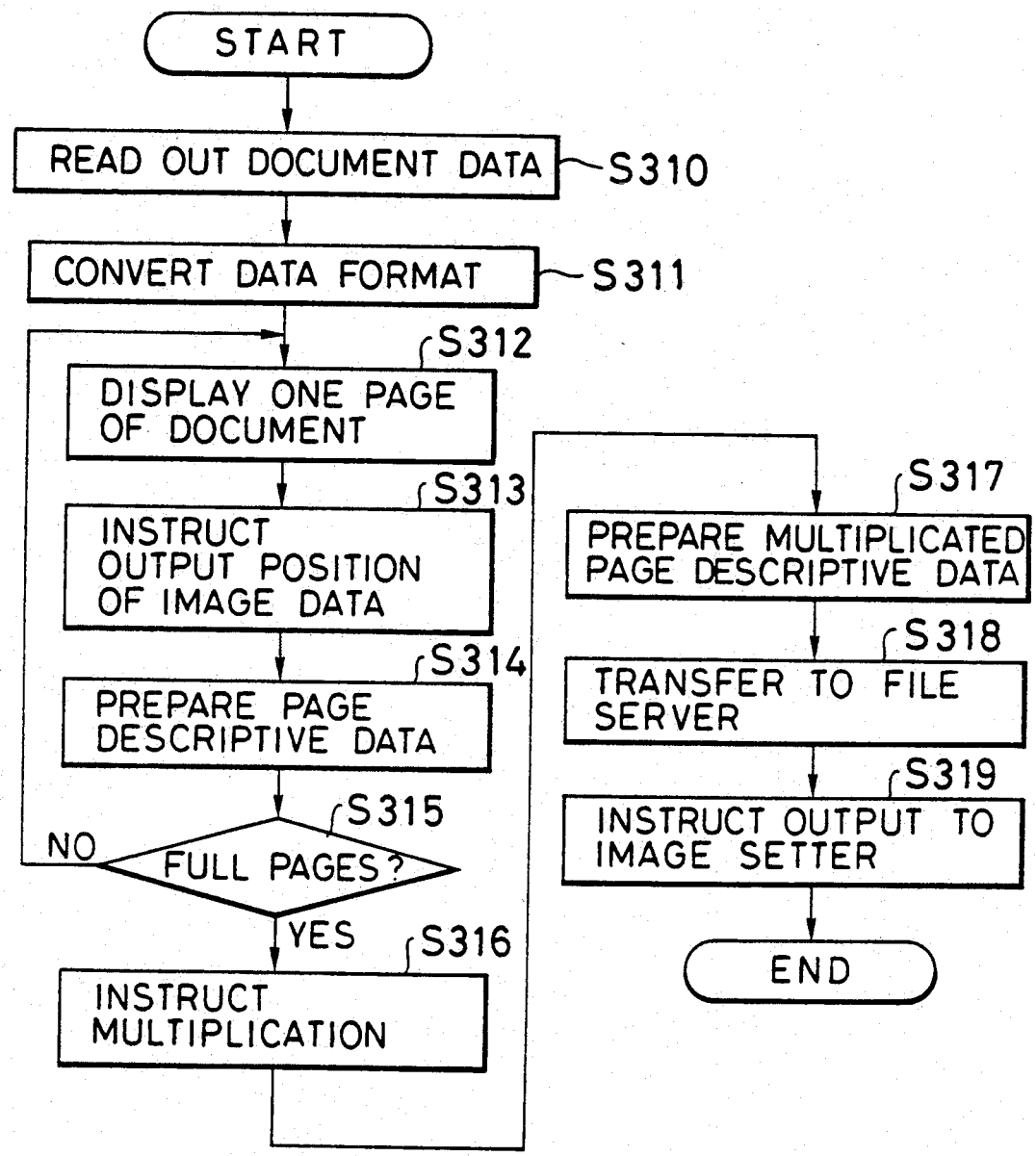
FIG. 3 is a flow chart showing an operation example of the work station.

FIG. 3 is a flow chart showing how the work station 300 functions. Document data edited and stored by the editing input unit 2 is read out of the floppy disc 3 (Step S310). Code information CD of the document data is subjected to conversion of the data format (Step S311). The content of the document in one page is then displayed in the CRT 301 (Step S312), while an image data output position of the image which may be read out of a layout pasteboard and the like, is instructed by the mouse 306, the keyboard 302 and the digitizer 303 (Step S313) to prepare the page description data for each page with a frame of the layout pasteboard (Step S314). In this manner, such data is prepared in full pages (Step S315), and then photo-composing for preparing a printing block copy is instructed by the keyboard 302 (Step S316), to obtain photo-composed page description data (Step S317). At the same time, the prepared data is transferred to the file server 200 (Step S318) simultaneously with instructing the image output to the image setter 400 for completing the operation (Step S319).

Figure 4:
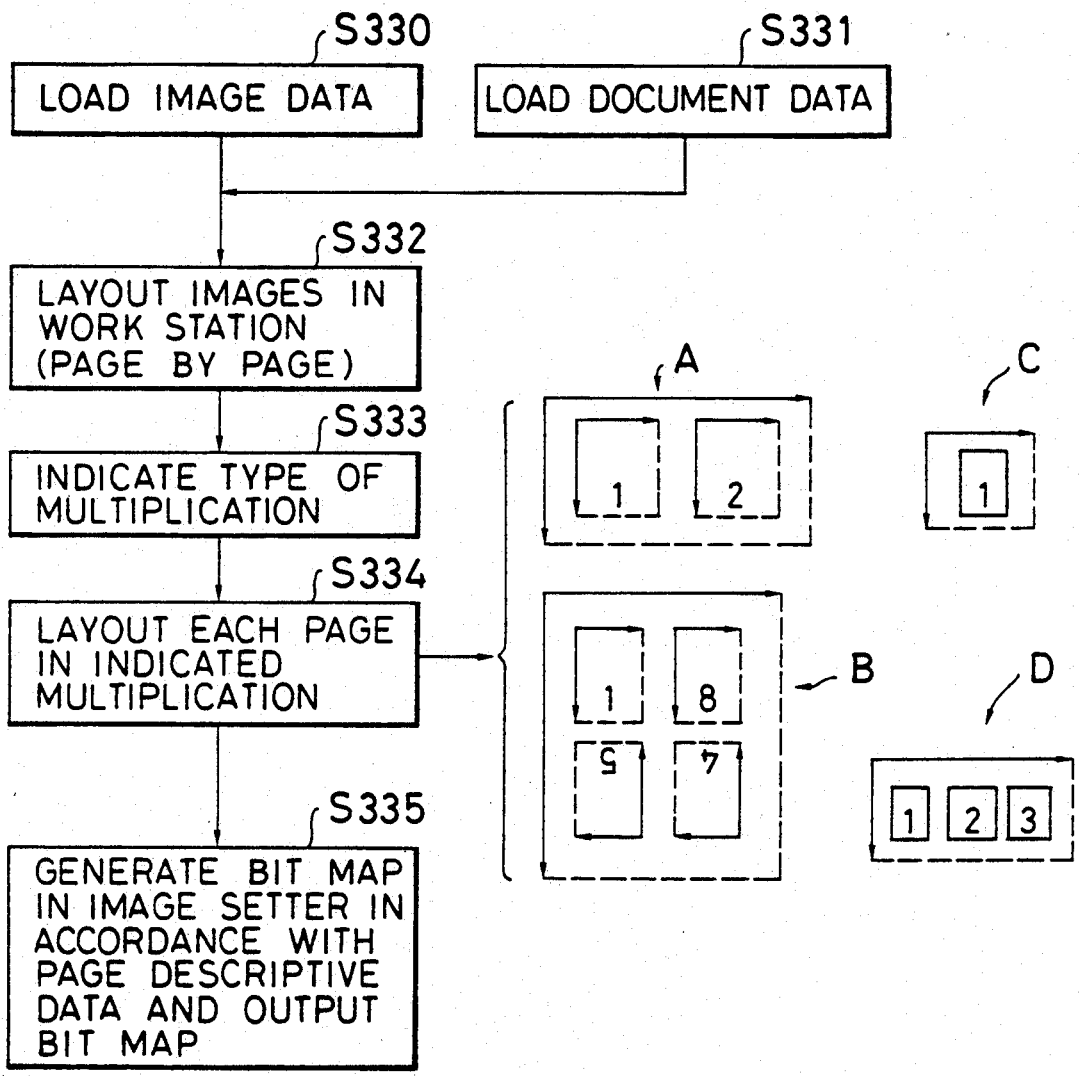
FIG. 4 is a flow chart explaining the operation of photo-composing.

Referring to FIG. 4, the example of the photo-composing process will now be described. The thinned image data in the hard discs 220, 221, . . . of the file server 200 are loaded in the work station 300 (Step S330) while the document data in the floppy disc 3 is loaded in the work station 300 (Step S331). Then, the necessary information is displayed on the CRT 301 of the work station 300, thus making it possible to suitably layout the image, the document and the frame page by page, by operating the mouse 306, the keyboard 302 and the digitizer 303 (Step S332). When indicating any of the types of photo-composing registered in advance with the keyboard 302 (Step S333), each page is displayed on the CRT 301 as being laid out in the indicated photo-composed state (for instance, "A" to "D" as shown in FIG. 4), with a suitable page number being given thereon (Step S334). The photo-composing state of each page is registered and stored with a proper page number being given thereon in advance with consideration given to the process of folding a plurality of pages in book binding and, for instance, takes the form of four pages of paper of trimmed size of A4, or eight pages of paper of a trimmed size of A5. When being selected and indicated any of the types of photo-composing states, the photo-composing state so selected is displayed with the proper page numbers being given to the associated pages (for instance, "1", "8", "5", "4", in figure B), as "A" to "D" shown in FIG. 4. The display on the CRT 301 on this occasion is designed to show only the photo-composing states of the pages, and the contents of the pages such as the images and characters thereon are not displayed, bit maps being generated by the image setter 400 in accordance with the page description data and then outputted (Step S335).

Figure 5:
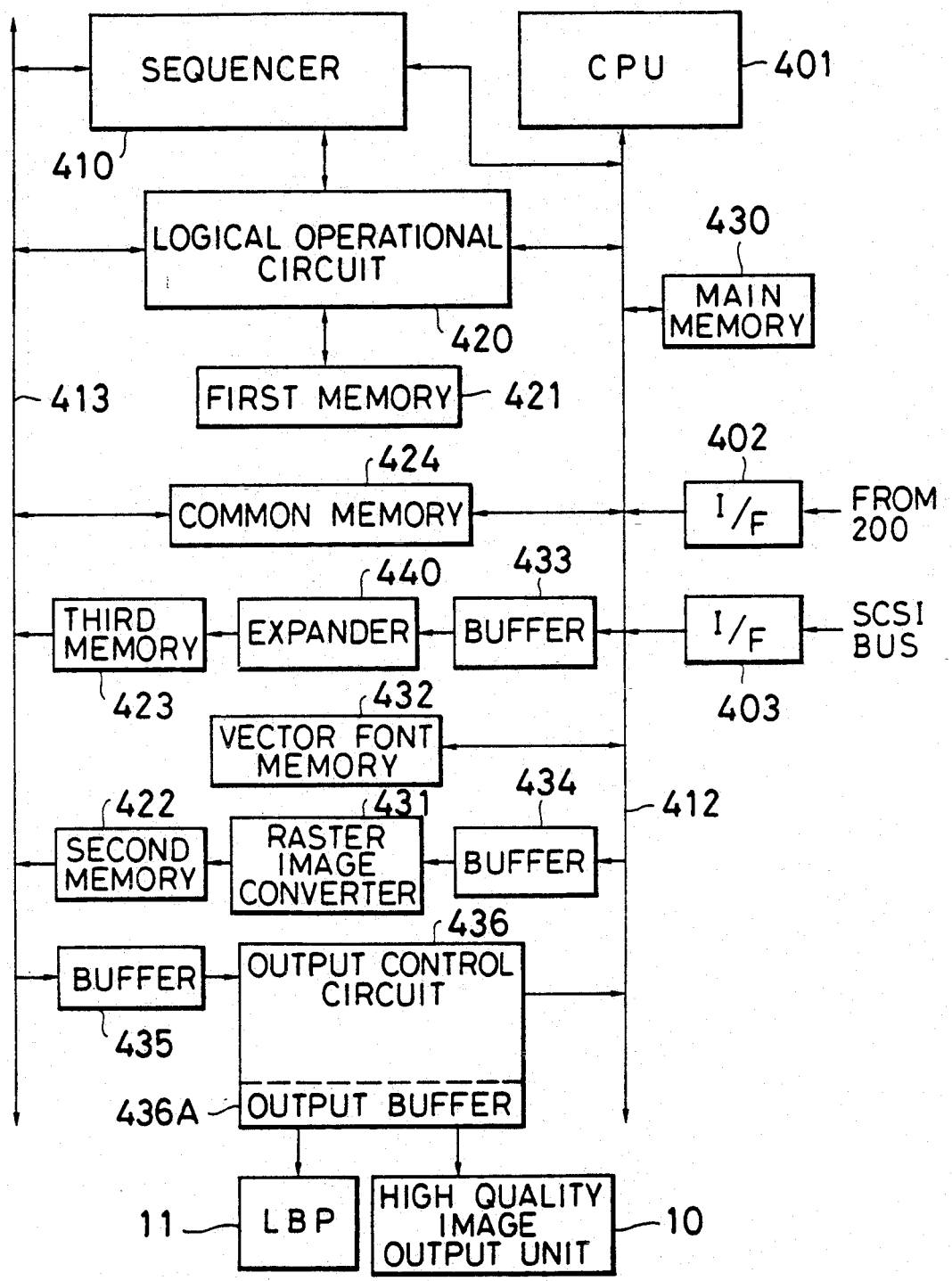
FIG. 5 is a block diagram showing in detail the configuration of the image setter.

FIG. 5 shows in detail an example of the configuration of the image setter 400. A CPU bus 412 and an image data bus 413 are connected to the sequencer 410, and a logical operation circuit 420 and a first memory 421 are also connected to the same sequencer 410. In addition, a main memory 430 for the CPU 401 is connected to the CPU bus 41, and a common memory 424 is disposed between the two buses 412 and 413 so as to connect the former to the latter, the output from the interfaces 402 and 403 being inputted into the CPU bus 412. A buffer 433, an expander 440 and a third memory 423 are connected to each other in that order between the CPU bus 412 and the image data bus 413, and a buffer 434, a raster image converter 431 and a second memory 422 are also connected to each other in that order between the same buses 412 and 413. In addition, a buffer 435 and an output control circuit 436 are also connected to each other between the buses 413 and 412. A vector font memory 432 is connected to the CPU bus 412, and the high quality image output unit 10 and the laser beam printer 11 are respectively connected to the output control circuit 436 via an output buffer 436A. Vector font is stored in the vector font memory 432, which font is needed at the time when character bit maps are generated by the raster image converter 431. The vector font is normally stored in the discs (220, 221, . . .), and it is not efficient to read out them via the SCSI bus every time a character bit map is generated. To deal with this, every needed vector font is designed to be loaded in the vector font memory 432 in advance, thus making it possible to improve the speed at which a character bit map is generated.

Figure 6:
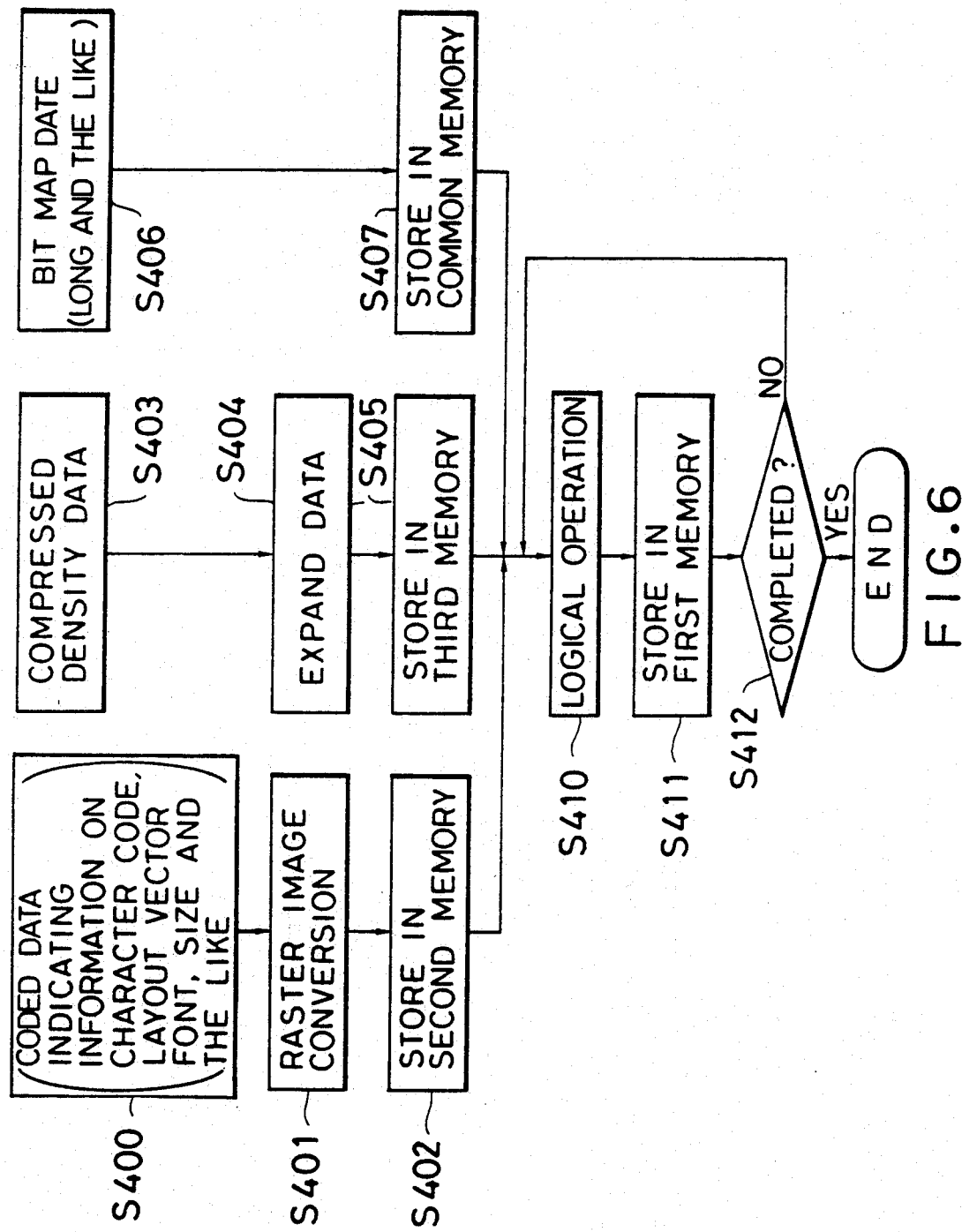
FIG. 6 is a flow chart showing an operation example of the same image setter.

The operation of the image setter 400 which is configured as described above is shown in FIG. 6. At first, a request for output indication is outputted from the file server 200 through the auxiliary data line 5 to the image setter 400 by using a file name stored in the hard discs 220, 221, . . . as a parameter. The specification to be outputted is written in the file. While sequentially decoding this specification, address computation of the coded data and the compressed data is performed relative to every image unit, and the overlapping processing by the logical operation is repeated relative to the address, the results of the processing then being stored in the first memory 421. Calling the parameter file via the SCSI bus, the image setter 400 repeats this operation. With regard to the coded data, for instance, the character code and such indicating information as position, type face, size and the like are inputted via the SCSI interface 403 (Step S400), and the raster image conversion of what is inputted is effected by the raster image converter 431 via the buffer 434 (Step S401), the raster image data then being stored in the second memory 422 (Step S402). In addition, the data-compressed image data is sent by way of the SCSI bus and is input via the interface 403 (Step S403), and the data is sent by way of the buffer 433 and is expanded by an expander 440 to be reproduced (Step S404), the reproduced image data then being stored in the third memory 423 (Step S405). Moreover, the bit map data such as logotypes and the like which are stored in the hard discs 220, 221, . . . are inputted via the interface 403 (Step S406) and are stored in the common memory 424 (Step S407). All data stored in the second memory 422 through the common memory 424 are bit map data, and the logical operation of these stored data is performed via the CPU 401 in the logical operation circuit 420 (Step S410), the data which are logically operated so as to synthesize, edit or image-process pictures, documents or the like are stored in the first memory 421 (Step S411). After the data have been stored in the first memory, judgement of whether the editing work is to be completed or not, in other words, whether or not there will be further additions or modifications to be made, is made (Step S412). This judgement operation continues until the logical operation of modification or the like has been completed. This logical operation circuit 420 effects in cooperation with the CPU 401, the logical operation of the bit map data generated from the coded data, i.e. characters or the like, the bit map data obtained by expanding the compressed image data and the "sum", "product", "difference", "exclusive-or" and the like of the bit maps, so as to generate image information for being output via the output 10 or the laser beam printer 11.

In the processing system of this invention as described above, because the image data density of the high quality output unit 10 is generally different from the image data density handled in the work station 300, when a display image is fit into a frame 7 to compose an image therewith, a space may happen to occur in the output image due to an error or a difference between the display image 6 and the frame 7 as shown in FIG. 7, thus making the block copy for printing undesirable. This error is caused because of the ambiguity that a picture element of the aforementioned display image for indicating a fit-in position, corresponds to a plurality of picture elements on the output image. That is, because in the operation of selecting out the most suitable picture element from the plurality of picture elements on the output image, any method for minimizing the error has not been effectively performed without referring the output image in the conventional method. For instance, here, the output image density is assumed to be 1200 dpi and the display image density thinned by the logical sum operation is assumed to be 300 dpi, and supporting the situation of picture elements as shown in FIG. 8. In this situation, if the display image picture element indicated to fit into the output image is transformed onto the output image so as to have its transformed coordinate at the center thereof, the transformed picture element may not correspond to the effective picture element of the output image.

To deal with this, in this invention the coordinate of the picture element to be transformed from the coordinate of the indicated picture element on the thinned image by the logical sum operation, is determined so that the error or difference between an efficient picture element on the original image and a newly transformed picture element may be minimized. For the purpose of attaining this process, in use of a 3×3 mask pattern as shown in FIG. 9, the coordinate of the picture element on the original image is required to be determined in accordance with the pattern condition of eight elements (#1 to #8) adjacent to the indicated picture element 8 on the thinned image by the logical sum operation. More specifically, by first distinguishing whether each picture element having even number (#2, #4, #6, #8) on the mask pattern shown in FIG. 9 is black or white, the number n of black picture elements is counted. Next, the number m of black picture elements is determined by judging whether each picture element of odd number (#1, #3, #5, #7) is black or white.

(A) In the following conditions, the center point of the indicated picture element is adopted as the most suitable coordinate.

Figure 10A:
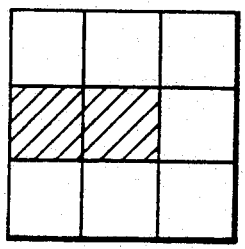
FIGS. 10A to 10J show picture element patterns for explaining the operation of the mask pattern.
Figure 10B:
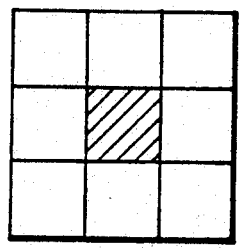

① When $n \leq 1$, for instance, the situation as shown in FIGS. 10A, 10B or the like.

Figure 10C:
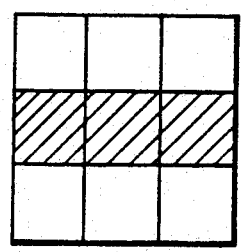
Figure 10D:
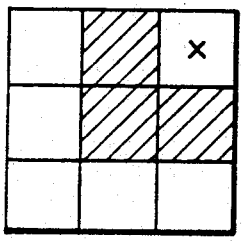

② When $n=2$ and one of the conditions (a) or (b) mentioned below is satisfied.
  (a) When a pair of opposite picture elements of even number are both black as shown in FIG. 10C.
  (b) When a pair of adjacent picture elements of even number are both black and the picture element held therebetween is white as shown in FIG. 10D.

Figure 10E:
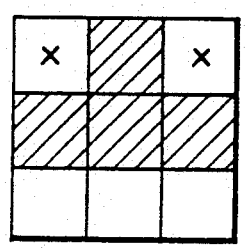
Figure 10F:
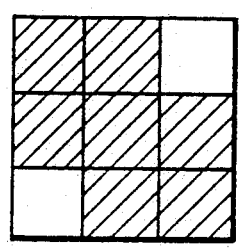

③ When n=3 and all picture elements of odd number held between each pair of adjacent picture elements of even number are white as shown in FIG. 10E.

④ When n=4 and any of the following condition is satisfied.
  (a) when m=4.
  (b) when m=2 and two picture elements of odd number are opposed each other.
  (c) when m≦1.

(B) In the following situation, after selecting out a picture element among the picture elements #1 to #8 as a correction element CP, the middle point between the center point of the indicated picture element (central picture element) and the center point of the correction picture element is determined as the most suitable coordinate.

Figure 10G:
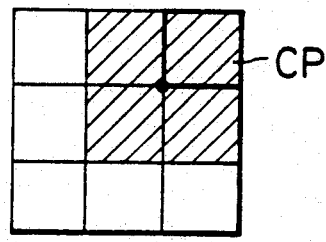

① when n=2 and the aforementioned condition (A) is not satisfied, the picture element held between a pair of adjacent picture element of even number is adopted as the correction picture element as shown in FIG. 10G.

Figure 10H:
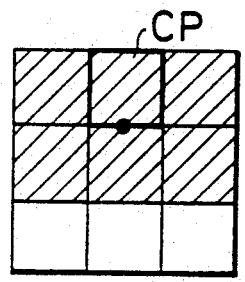

② when n=3 and the aforementioned condition (A) is not satisfied, the picture element opposite to the white picture element of even number is adopted as the correction picture element as shown in FIG. 10H.

Figure 10I:
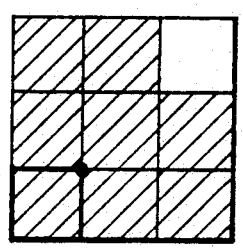
Figure 10J:
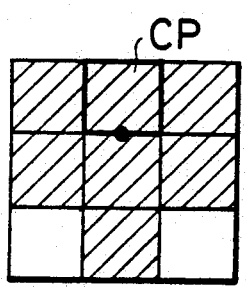

③ when n=4 and the aforementioned condition (A) is not satisfied; if m=3, the picture element opposit to the white picture element is adopted as the correction picture element CP as shown in FIG. 10I; if m=2, the picture element of even number held between a pair of adjacent black picture element of odd number is adopted as correction picture element as shown in FIG. 10J.

In the explanation described above, the correction picture element and the most suitable coordinate value are determined according to the situation of odd number picture elements and even number picture elements of the 3×3 picture elements. However, it is also possible to determine the most suitable coordinate value in accordance with $2^8$ patterns on all picture elements. To discover a wide range of patterns, it is possible to take a larger size of the mask pattern than that of the 3×3 picture elements.

According to the image composing method of this invention, it is possible to edit and process a large quantity image data of characters and pictures at a high speed and to output high quality images for printing with the form indicated by layout and it is possible to easily make bit maps of vector information by the hardware and further to easily image-process, manufacture and edit. In the image processing system for outputting the image laid out for characters and pictures, if the image data density of the image output unit is different from that of the work station, the transformed coordinate of the picture element on the original image is determined by considering the patterns of eight picture elements adjacent to the indicated picture element on the thinned image by the logical sum operation, so that the image (design, screen) may be fit into the frame without error.

It should be understood that many modifications and adaptations of the invention will become apparent to those skilled in the art and it is intended to encompass such obvious modifications and changes in the scope of the claims appended hereto.

What is claimed is:

1. An image composing method, in an image processing system comprising an input controller to manipulate and compress density data for an image read out by an input unit and for temporarily storing compressed image data in a buffer; a work station for editing not only a code information edited by an editing input unit but also said image data by the use of an input operating means and a display means; a file server connected to said input controller and said work station by bus lines for storing said image data, said code information and edited data picture-edited by said work station in a memory means; and an image setter for reading out said edited data stored in said memory means and subjecting said edited data to required data processing to output the image on the image output unit, said method comprising the steps of:

inputting an image of a layout pasteboard for printing and a print image as image information by means of said input unit so as to store them in said memory means,
  displaying a frame drawn on said layout pasteboard and said print image on said display means to be subjected to layout-drawing in said work station,
  when a layout image, being adapted to have a higher resolution than said display image, is output and recorded while being fit into said frame, correcting a coordinate between said layout image and said frame, thus preventing any space from existing therebetween;
  when an area within said frame being screened is output and recorded, correcting a coordinate between said screened area and said frame, thus preventing any space from existing therebetween; and
  obtaining a picture element coordinate so as to minimize an error between a picture element on an original image and a newly transformed picture element, wherein said obtaining step comprises obtaining a picture element coordinate using a 3×3 mask pattern.

2. An image composing method as claimed in claim 1, wherein said method further comprises the step of determining a number n of black picture elements by distinguishing whether each picture element having an even number on said mask pattern is black or white and a number m of black picture elements by judging whether each picture element having an odd number is black or white.

3. An image composing method as claimed in claim 2, wherein a center point of an indicated picture element is adopted as a most suitable coordinate in accordance with the following conditions ① to ④:
  ① When n≦1
  ② When n=2 and conditions (1) or (2) below are satisfied
    (1) when a pair of opposite picture elements of even number are both black
    (2) when a pair of adjacent picture elements of even number are both black and a picture element held therebetween is white
  ③ When n=3 and all picture elements of odd number held between each pair of adjacent picture elements of even number are white
  ④ When n=4 and any of conditions (1)–(3) below are satisfied
    (1) when m=4
    (2) when m=2 and two picture elements of odd number are opposed with respect to each other
    (3) when m≦1.

4. An image composing method as claimed in claim 3, wherein a middle point between a center point of the indicated picture element and a center point of a correction picture element is determined as the most suitable coordinate in accordance with the following conditions ①  to ③:

①  When n=2 and the conditions in claim 5 are not satisfied, the picture element held between a pair of adjacent picture elements of even number is adopted as the correction picture element.

②  When n—3 and the conditions in claim 3 are not satisfied, the picture element opposite to a white picture element of even number is adopted as the correction picture element.

③  When n=4 and the conditions in claim 3 are not satisfied; if m=3, the picture element opposite to a white picture element is adopted as the correction picture element; if m=2, the picture element of even number held between a pair of adjacent black picture elements of odd number is adopted as correction picture element.

5. In an image processing system comprising an input unit for reading out an original image as image data; a work station for editing code information provided by an editing input unit and thinned image data corresponding to said image data by the use of an input operating means and a display means to produce edited data; memory means for storing said image data, said code information and said edited data; and an image setter for reading out said edited data stored in said memory means and subjecting said edited data to required data processing so as to permit output of an output image on an image output unit, the image composing method comprising the steps of:

inputting a layout pasteboard image for printing and said original image as image data by means of said input unit so as to store said image data in said memory means, displaying a frame drawn on a thinned layout pasteboard corresponding to said layout pasteboard image and said thinned image data on said display means to be subjected to layout-drawing in said work station, when a layout image, being adapted to have a higher resolution than said thinned image data, is output and recorded while being fit into said frame, correcting discontinuities between said layout image and said frame, thus preventing any space from existing therebetween;

when an area within said frame being screened is output and recorded, correcting discontinuities between said screened area and said frame, thus preventing any space from existing therebetween; and obtaining a picture element coordinate so as to minimize an error between a picture element on an original image and a newly transformed picture element, wherein said obtaining step comprises obtaining a picture element coordinate using a 3×3 mask pattern.

6. The image composing method of claim 5, wherein said method further comprises the step of determining a number n of black picture elements by distinguishing whether each picture element having an even number on said mask pattern is black or white and a number m of black picture elements by judging whether each picture element having an odd number is black or white.

7. The image composing method of claim 6, wherein a center point of an indicated picture element is adopted as a most suitable coordinate in accordance with the following conditions ①  to ④:

①  When $n \leq 1$.

②  When n=2 and conditions (1) or (2) below are satisfied.
   (1) When a pair of opposite picture elements of even number are both black.
   (2) When a pair of adjacent picture elements of even number are both black and a picture element held therebetween is white.

③  When n=3 and all picture elements of odd number held between each pair of adjacent picture elements of even number are white.

④  When n=4 and any of conditions (1)-(3) below are satisfied.
   (1) when m=4.
   (2) when m=2 and two picture elements of odd number are opposed each other.
   (3) when $m \leq 1$.

8. The image composing method of claim 7, wherein a middle point between a center point of the indicated picture element and a center point of a correction picture element is determined as the most suitable coordinate in accordance with the following conditions ①  to ③:

①  When n=2 and the conditions in claim 3 are not satisfied, the picture element held between a pair of adjacent picture element of even number is adopted as the correction picture element.

②  When n—3 and the conditions in claim 3 are not satisfied, the picture element opposite to white picture element of even number is adopted as the corrections picture element.

③  When n=4 and the conditions in claim 3 are not satisfied; if m=3, the picture element opposite to white picture element is adopted as the correction picture element; if m=2, the picture element of even number held between a pair adjacent black picture element of odd number is adopted as correction picture element.

* * * * *